(12) United States Patent
Hulse et al.

(10) Patent No.: US 6,874,924 B1
(45) Date of Patent: Apr. 5, 2005

(54) ILLUMINATION DEVICE FOR SIMULATION OF NEON LIGHTING

(75) Inventors: George R. Hulse, Cookeville, TN (US); Joe A. Chambers, Cookeville, TN (US)

(73) Assignee: iLight Technologies, Inc., Evanston, IL (US)

( * ) Notice: Subject to any disclaimer, the term of this patent is extended or adjusted under 35 U.S.C. 154(b) by 0 days.

(21) Appl. No.: 10/385,007

(22) Filed: Mar. 10, 2003

Related U.S. Application Data

(60) Provisional application No. 60/364,309, filed on Mar. 14, 2002.

(51) Int. Cl.⁷ .................................................. F21V 8/00
(52) U.S. Cl. ...................... 362/551; 362/555; 362/26; 362/235; 362/249; 362/219
(58) Field of Search .......................... 362/235, 31, 249, 362/800, 267, 310, 219, 551, 26, 555, 297, 362/298, 559, 560, 300, 311

(56) References Cited

U.S. PATENT DOCUMENTS

| | | | |
|---|---|---|---|
| 4,111,520 A | 9/1978 | Bernal G. | |
| 4,298,869 A | 11/1981 | Okuno | |
| 4,376,946 A | 3/1983 | Kaminow et al. | |
| 4,597,033 A | 6/1986 | Meggs et al. | |
| 4,607,317 A | 8/1986 | Lin | |
| 4,767,172 A | 8/1988 | Nichols et al. | |
| 4,785,567 A | 11/1988 | Consiglio | |
| 4,891,896 A | 1/1990 | Boren | |
| 4,976,057 A | 12/1990 | Bianchi | |
| 4,996,632 A | 2/1991 | Aikens | |
| 5,057,981 A | 10/1991 | Bowen et al. | |
| 5,151,679 A | 9/1992 | Dimmick | |
| 5,201,020 A | 4/1993 | Kannabiran | |
| 5,219,217 A | 6/1993 | Aikens | |
| 5,301,090 A | 4/1994 | Hed | |
| 5,303,133 A | 4/1994 | Wagner | |
| 5,365,411 A | 11/1994 | Rycroft et al. | |
| 5,375,043 A | 12/1994 | Tokunaga | |
| 5,410,453 A | 4/1995 | Ruskouski | |
| 5,416,679 A | 5/1995 | Ruskouski et al. | |
| 5,459,955 A | 10/1995 | Ruskouski et al. | |

(Continued)

Primary Examiner—Thomas M. Sember
(74) Attorney, Agent, or Firm—Stites & Harbison, PLLC; David W. Nagle, Jr.

(57) ABSTRACT

An illumination device includes an elongated and substantially cylindrical waveguide, which has a light-emitting outer surface and an interior semi-reflective portion spaced at a predetermined distance from the light-emitting outer surface. A channel is defined through a portion the waveguide along the length thereof and is adapted to receive an elongated light source such that emitted light is directed into at least one of the wall surfaces defined by the channel. As the light enters and is directed about the circumference of the waveguide, a portion of the light is scattered and emitted through the light-emitting outer surface of the waveguide. Light is also reflected by the semi-reflective portion, causing additional light to be scattered and emitted through the light-emitting outer surface of the waveguide. The result of this guiding, reflecting, and emission of light is a substantially homogenous and uniform light intensity pattern over the light-emitting outer surface of the waveguide so as to simulate neon lighting.

13 Claims, 3 Drawing Sheets

U.S. PATENT DOCUMENTS

| | | |
|---|---|---|
| 5,475,786 A | 12/1995 | Nishiguchi et al. |
| 5,497,440 A | 3/1996 | Croitoru et al. |
| 5,526,236 A | 6/1996 | Burnes et al. |
| 5,537,297 A | 7/1996 | Ghandehari |
| 5,588,236 A | 12/1996 | Suzuki |
| 5,613,751 A | 3/1997 | Parker et al. |
| 5,618,096 A | 4/1997 | Parker et al. |
| 5,640,792 A | 6/1997 | Smith et al. |
| 5,694,513 A | 12/1997 | Okaniwa |
| 5,842,297 A | 12/1998 | Tung |
| 5,876,107 A | 3/1999 | Parker et al. |
| 5,879,076 A | 3/1999 | Cross |
| 5,887,968 A | 3/1999 | Logan |
| 5,921,652 A | 7/1999 | Parker et al. |
| 5,934,792 A | 8/1999 | Camarota |
| 5,950,340 A | 9/1999 | Woo |
| 5,964,518 A | 10/1999 | Shen |
| 5,996,263 A | 12/1999 | Black |
| 6,023,869 A | 2/2000 | Durbin |
| 6,042,248 A | 3/2000 | Hannah et al. |
| 6,065,846 A * | 5/2000 | Kato et al. ................... 362/30 |
| 6,076,294 A | 6/2000 | Durbin |
| 6,079,838 A | 6/2000 | Parker et al. |
| 6,095,673 A | 8/2000 | Goto et al. |
| 6,123,442 A | 9/2000 | Freier et al. |
| 6,146,006 A | 11/2000 | Cross |
| 6,158,882 A | 12/2000 | Bischoff, Jr. |
| 6,186,645 B1 | 2/2001 | Camarota |
| 6,193,385 B1 | 2/2001 | Maki et al. |
| 6,204,899 B1 | 3/2001 | Hall |
| 6,283,612 B1 | 9/2001 | Hunter |
| 6,354,714 B1 | 3/2002 | Rhodes |
| 6,361,186 B1 | 3/2002 | Slayden |
| 6,394,623 B1 | 5/2002 | Tsui |
| 6,404,131 B1 * | 6/2002 | Kawano et al. ............... 315/82 |
| 6,488,397 B1 * | 12/2002 | Masutani et al. ........... 362/551 |
| 6,676,284 B1 * | 1/2004 | Wynne Willson ........... 362/555 |

* cited by examiner

ILLUMINATION DEVICE FOR SIMULATION OF NEON LIGHTING

CROSS-REFERENCE TO RELATED APPLICATIONS

The present application claims priority from U.S. Provisional Application Ser. No. 60/364,309 filed Mar. 14, 2003, the entire disclosure of which is incorporated herein by reference.

BACKGROUND OF THE INVENTION

The present invention relates to illumination devices using an optical waveguide, and, more particularly, to illumination devices for the simulation of neon lighting using an optical waveguide and high-intensity, low-voltage light sources, and ideally adapted for signage and advertising uses.

Neon lighting, which is produced by the electrical stimulation of the electrons in a low-pressure, neon gas-filled glass tube, has been a main stay in advertising and for outlining channel letters and building structures for many years. A characteristic of neon lighting is that the tubing encompassing the gas has an even glow over its entire length irrespective of the viewing angle. This characteristic makes neon lighting adaptable for many advertising applications, including script writing and designs, because the glass tubing can be fabricated into curved and twisted configurations simulating script writing and intricate designs. The even glow of neon lighting being typically devoid of hot spots allows for advertising without visual and unsightly distractions. Thus, any illumination device that is developed to duplicate the effects of neon lighting must also have even light distribution over its length and about its circumference.

Equally important, such lighting devices must have a brightness that is at least comparable to neon lighting. Furthermore, since neon lighting is a well established industry, a competitive lighting device must be lightweight and have superior "handleability" characteristics in order to make inroads into the neon lighting market. Neon lighting is recognized as being fragile in nature. Because of the fragility and heavy weight, primarily due to its supporting infrastructure, neon lighting is expensive to package and ship. Moreover, it is extremely awkward to initially handle, install, and/or replace. Any lighting device that can provide those previously enumerated positive characteristics of neon lighting, while minimizing its size, weight, and handleability shortcomings, will provide for a significant advance in the lighting technology.

U.S. Pat. No. 4,891,896 issued on Jan. 9, 1990 to Boren and assigned to the Gulf Development Company is an example of an attempt to duplicate neon lighting. Like this attempt, most prior art neon simulations have resulted in structures difficult to fabricate and providing little in the way of weight and handling benefits. The Boren patent exemplifies this by providing a plastic panel with essentially bas-relief lettering. The material comprising the lettering is transparent and coated with a translucent material. The surrounding material is opaque. When the panel is backlit, the lettering tends to glow with a neon-like intensity.

The more recent introduction of lightweight and breakage resistant point light sources, as exemplified by high-intensity light-emitting diodes, have shown great promise to those interested in illumination devices that may simulate neon lighting and have stimulated much effort in that direction. However, the twin attributes of neon lighting, uniformity and brightness, have proven to be difficult obstacles to overcome as such attempts to simulate neon lighting have largely been stymied by the tradeoffs between light distribution to promote the uniformity and brightness. For example, U.S. Pat. No. 4,976,057 issued Dec. 11, 1990 to Bianchi describes a device that includes a transparent or translucent hollow plastic tubing mounted in juxtaposition to a sheet of material having light transmitting areas that are co-extensive to the tubing. The sheet is backlit by light sources such as LEDs which trace the configuration of the tubing. The tubing can be made into any shape including lettering. While the tubing may be lit by such arrangement, the light transfer efficiencies with such an arrangement is likely to result in a "glowing" tube having insufficient intensity to match that of neon lighting. The use of point light sources such as LEDs may provide intense light that rival or exceed neon lighting, but when arranged in arrays, lack the uniformity needed and unfortunately provide alternate high and low intensity regions in the illuminated surfaces. Attempts to smooth out the light have resulted in lighting that has unacceptably low intensity levels.

In an attempt to address some of the shortcomings of neon, co-pending and commonly assigned U.S. patent application Ser. No. 09/982,705 describes an illumination device comprised of a profiled rod of material having waveguide properties that preferentially scatters light entering one lateral surface ("light receiving surface") so that the resulting light intensity pattern emitted by another lateral surface of the rod ("light-emitting surface") is elongated along the length of the rod. U.S. patent application Ser. No. 09/982,705 is incorporated herein by this reference.

As described in U.S. patent application Ser. No. 09/982,705, a light source extends along and is positioned adjacent the light receiving surface and spaced from the light-emitting surface a distance sufficient to create an elongated light intensity pattern with a major axis along the length of the rod and a minor axis that has a width that covers substantially the entire circumferential width of the light-emitting surface. In a preferred arrangement, the light source is a string of point light sources spaced a distance apart sufficient to permit the mapping of the light emitted by each point light source into the rod so as to create elongated and overlapping light intensity patterns along the light-emitting surface and circumferentially about the surface so that the collective light intensity pattern is perceived as being uniform over the entire light-emitting surface.

One of the essential features of the illumination device described and claimed in U.S. patent application Ser. No. 09/982,705 is the uniformity and intensity of the light emitted by the illumination device. While it is important that the disadvantages of neon lighting be avoided (for example, weight and fragility), an illumination device would have little commercial or practical value if the proper light uniformity and intensity could not be obtained. This objective is achieved primarily through the use of a "leaky" waveguide rod. A "leaky" waveguide is structural member that functions both as an optical waveguide and light scattering member. As a waveguide, it tends to preferentially direct light entering the waveguide along the axial direction of the waveguide, while as a light scattering member, it urges the light out of a lateral surface of the waveguide. As a result, what is visually perceived is an elongated light pattern being emitted along the light-emitting lateral surface of the waveguide.

It is a similar object of the present invention to provide for an alternative to neon lighting.

A further important object of the present invention is to provide for an illumination device that is safe to transport, simple to install, and economical to operate while providing all of the advantages of neon lighting, including uniformity and brightness of the emitted light.

These and other objects of the invention will become readily apparent and addressed through a reading of the discussion below and appended drawings.

SUMMARY OF THE PRESENT INVENTION

An illumination device made in accordance with the present invention includes an elongated and substantially cylindrical waveguide, which has a light-emitting outer surface. A channel is defined through a portion of the waveguide along the length thereof. This channel is adapted to receive an elongated light source and associated electrical accessories, for example, a multiplicity of point light sources such as high-intensity, light-emitting diodes (LEDs). The channel defines first and second opposite wall surfaces in the waveguide. When the LEDs are positioned and oriented within the channel, emitted light is directed into at least one of these wall surfaces.

The waveguide of the illumination device of the present invention is further provided with an interior semi-reflective portion spaced at a predetermined distance from the light-emitting outer surface. This semi-reflective portion is preferably a reflective coating, such as an applied paint or a co-extruded plastic, which reflects a significant portion of light that strikes its surface.

As light is emitted from the LEDs, a significant portion of the light is directed into at least one of the wall surfaces of the waveguide. As the light enters and is directed about the circumference of the waveguide, a portion of the light is scattered and emitted through the light-emitting outer surface of the waveguide. Light is also scattered and emitted through the inner circumferential surface of the waveguide. However, the semi-reflective portion reflects much of this light and causes it to also be scattered and emitted through the light-emitting outer surface of the waveguide. The result of this guiding, reflecting, and emission of light is a substantially homogenous and uniform light intensity pattern over the light-emitting outer surface of the waveguide so as to simulate neon lighting.

DETAILED DESCRIPTION OF THE INVENTION

The present invention is an illumination device for the simulation of neon lighting using an optical waveguide and high-intensity, low-voltage light sources. To provide the desired result, i.e., an illumination device that is an effective simulator of neon lighting, it is important that the proper materials be selected for the component parts, and that such parts are appropriately and geometrically positioned so that the resulting illumination device has an essentially uniform light intensity distribution pattern over its outer surface with the maximum obtainable brightness.

Figure 1:
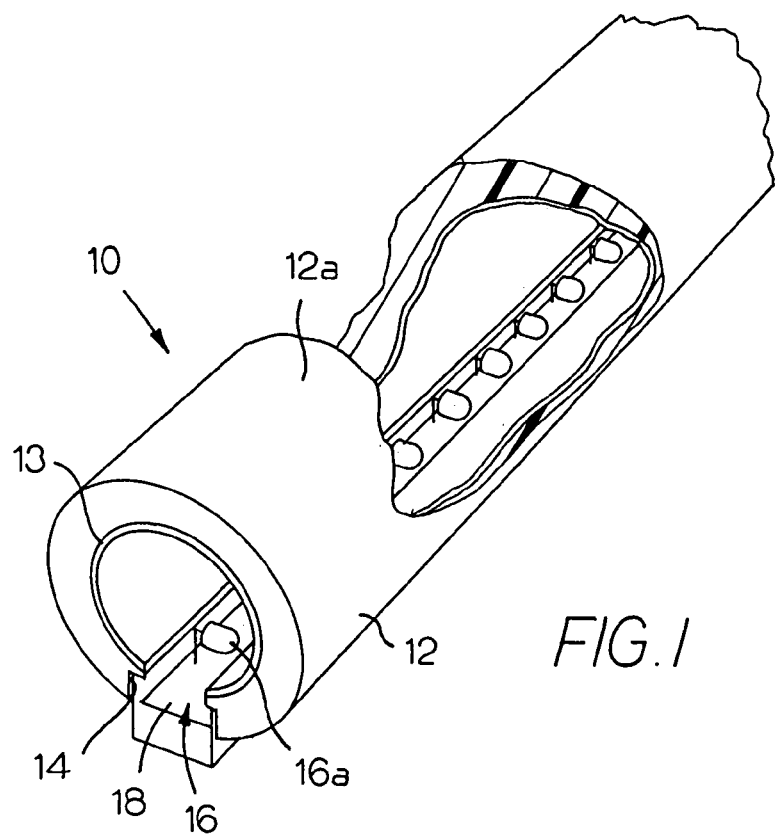
FIG. 1 is a perspective view of an illumination device made in accordance with the present invention, with a portion of the waveguide broken away to illustrate the position of a series of LEDs relative to the waveguide.
Figures 2, 2A:
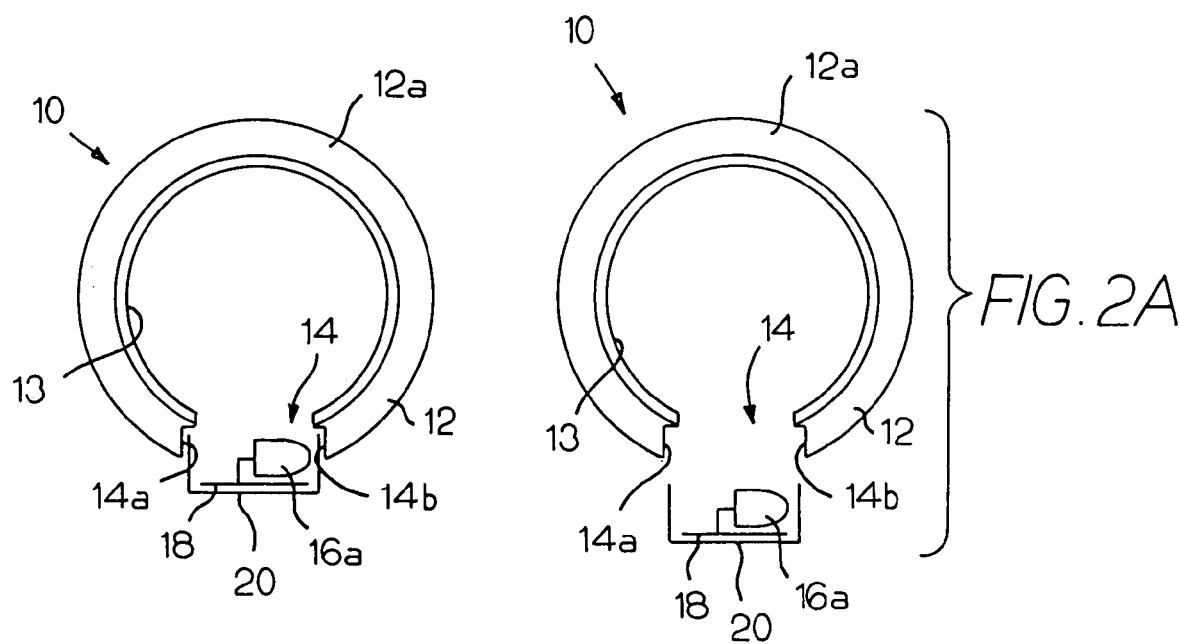
FIG. 2 is an end view of the illumination device of FIG. 1.
FIG. 2A is an end view of the illumination device similar to that of FIG. 2, but with the tray to which the circuit board and associated LEDs are received removed from the channel defined by the waveguide.

FIGS. 1, 2, and 2A illustrate a preferred illumination device 10 made in accordance with the present invention. The illumination device 10 includes an elongated and substantially cylindrical waveguide 12, which has a light-emitting outer surface 12a. In this particular embodiment, the waveguide 12 has an annular cross-section, but the illumination device 10 of the present invention is not limited to such a cross-sectional geometry as will be further discussed below. The waveguide 12 can be extruded or otherwise manufactured from a variety of commercially available plastics, including, for example, an acrylic or polycarbonate. In this regard, although not critical to the illumination device 10 of the present invention, the material used to manufacture the waveguide may also have light scattering properties such that it functions both as an optical waveguide and a light scattering member—similar to the leaky waveguide described in commonly assigned and co-pending U.S. patent application Ser. No. 09/982,705. One such acrylic material is commercially available from AtoHaas, Philadelphia, Pa. under order number DR66080.

A channel 14 is defined through a portion the waveguide 12 along the length thereof, in this embodiment, entirely through the wall of the annular waveguide 12. This channel 14 is adapted to receive an elongated light source and associated electrical accessories (generally indicated by reference numeral 16), which, in this particular embodiment, is a multiplicity of point light sources, specifically high-intensity, light-emitting diodes (LEDs) 16a. As best shown in FIGS. 2 and 2A, it is contemplated that LEDs 16a be operably connected to a circuit board 18, which is then received in a tray 20 or similar support structure. The tray 20 containing the circuit board 18 and associated LEDs 16a can then be snapped into or otherwise positioned in and secured relative to the channel 14 of the waveguide 12.

Although the channel 14 extends entirely through the wall of the annular waveguide 12 in the embodiment illustrated in FIGS. 1, 2, and 2A, it is understood that the channel 14 need not extend all the way through wall to achieve the objectives of the present invention.

As also best shown in FIGS. 2 and 2A, the channel 14 defines first and second opposite wall surfaces 14a, 14b in the waveguide 12. When the LEDs 16a are positioned and oriented within the channel 14, emitted light is directed into at least one of these wall surfaces 14a, 14b; for example, in FIG. 2, emitted light would be directed into the rightmost wall surface 14b. If light is directed into the rightmost wall surface 14b, it is preferred the other wall surface 14a be reflective.

The waveguide 12 of the illumination device 10 of the present invention is further provided with an interior semi-reflective portion 13 spaced at a predetermined distance from the light-emitting outer surface 12a. Since this particular waveguide 12 has an annular cross-section, the interior semi-reflective portion 13 of the waveguide 12 is secured to the inner circumferential surface 12b of the waveguide 12. This semi-reflective portion 13 is preferably a reflective coating, such as an applied paint or a co-extruded plastic, which reflects a significant portion of light that strikes its surface. For an example, in one preferred embodiment, the interior semi-reflective portion 13 is an indoor/outdoor fluorescent spray paint applied to the inner circumferential surface 12b of the waveguide 12, specifically an indoor/outdoor fluorescent spray paint manufactured and distributed by the Sherman Williams Company under the registered trademark Krylon®. In this regard, color no. 3102 (yellow orange) has been demonstrated to be an effective paint color for this application.

As light is emitted from the LEDs 16a, a significant portion of the light is directed into at least one of the wall surfaces 14a, 14b of the waveguide 12. As the light enters and is directed about the circumference of the waveguide 12, a portion of the light is scattered and emitted through the light-emitting outer surface 12a of the waveguide 12. Light is also scattered and emitted through the inner circumferential surface 12b of the waveguide 12. However, the semi-reflective portion 13 reflects much of this light and causes it to also be scattered and emitted through the light-emitting outer surface 12a of the waveguide 12. The result of this guiding, reflecting, and emission of light is a substantially homogenous and uniform light intensity pattern over the light-emitting outer surface 12a of the waveguide 12 so as to simulate neon lighting.

In the embodiment illustrated in FIGS. 1, 2, and 2A, it is also recognized that a portion of the light emitted by the LEDs 16a may not be directed into the waveguide 12, but rather enter the interior portion of the annular waveguide 12. Thus, it is contemplated that the interior semi-reflective portion 13 allow some of this light to pass through it and into the waveguide 12 for subsequent scattering and emission through the light-emitting outer surface 12a of the waveguide 12.

Because of its annular construction, it is noteworthy that by encapsulating the elongated light source and associated electrical accessories 16 in an appropriate potting compound, the illumination device can be made substantially watertight such that water or another liquid could flow through the center of the annular waveguide. Or, this could be similarly accomplished through construction of a waveguide in which the channel 14 does not extend entirely through the wall of the waveguide 12.

Figure 3:
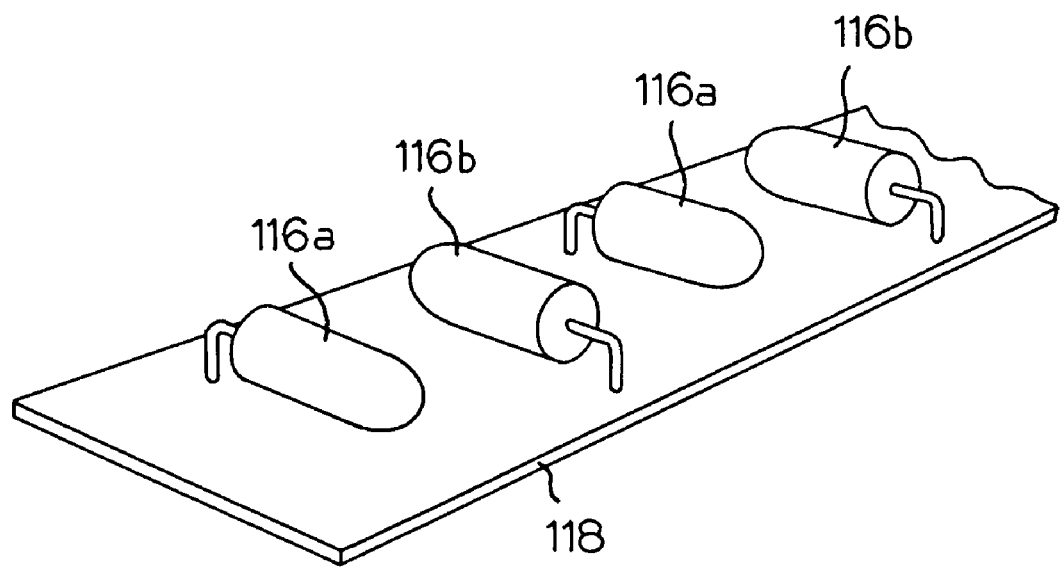
FIG. 3 is a perspective view of a circuit board for incorporation into an illumination device made in accordance with the present invention, illustrating LEDs being oriented in alternating directions long the length of the circuit board.

FIG. 3 is a perspective view of an alternate circuit board 118 for incorporation into an illumination device made in accordance with the present invention, illustrating LEDs 116a, 116b being oriented in alternating directions along the length of the circuit board 118. It is contemplated that such a construction would ensure an even glow about the circumference of the waveguide.

Figure 4:
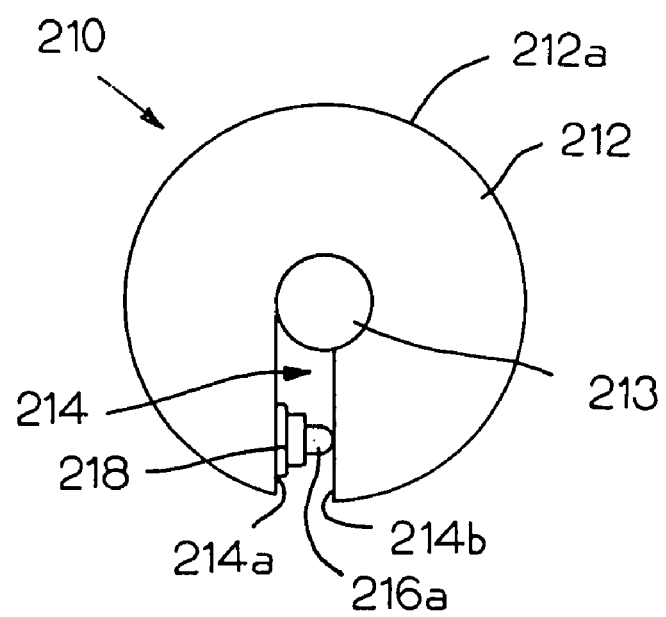
FIG. 4 is an end view of an alternate embodiment of an illumination device made in accordance with the present invention.

FIG. 4 is an end view of an alternate embodiment of an illumination device 210 made in accordance with the present invention. In this particular embodiment, the waveguide 212 has a substantially solid cross-section with the interior semi-reflective portion 213 of the waveguide 212 being a central co-axial rod that extends the length of the waveguide 212. A channel 214 is again defined through a portion the waveguide 212 along the length thereof. This channel 214 is adapted to receive an elongated light source and associated electrical accessories, which is preferably a multiplicity high-intensity, light-emitting diodes (LEDs) 216a. This channel 214 defines first and second opposite wall surfaces 214a, 214b in the waveguide 12. The LEDs 16a are operably connected to a circuit board 218 which is then secured to a first wall surface 214a, with emitted light being directed into the second wall surface 214b. As light is emitted from the LEDs 216a, the light is directed into the second wall surfaces 214b of the waveguide 212. As the light enters and is directed about the circumference of the waveguide 212, a portion of the light is scattered and emitted through the light-emitting outer surface 212a of the waveguide 212. Light is also scattered and emitted through the inner circumferential surface 212b of the waveguide 212. However, the semi-reflective portion 213 reflects much of this light and causes it to also be scattered and emitted through the light-emitting outer surface 212a of the waveguide 212. The result of this guiding, reflecting, and emission of light is a substantially homogenous and uniform light intensity pattern over the light-emitting outer surface 212a of the waveguide 212 so as to simulate neon lighting.

Figure 5:
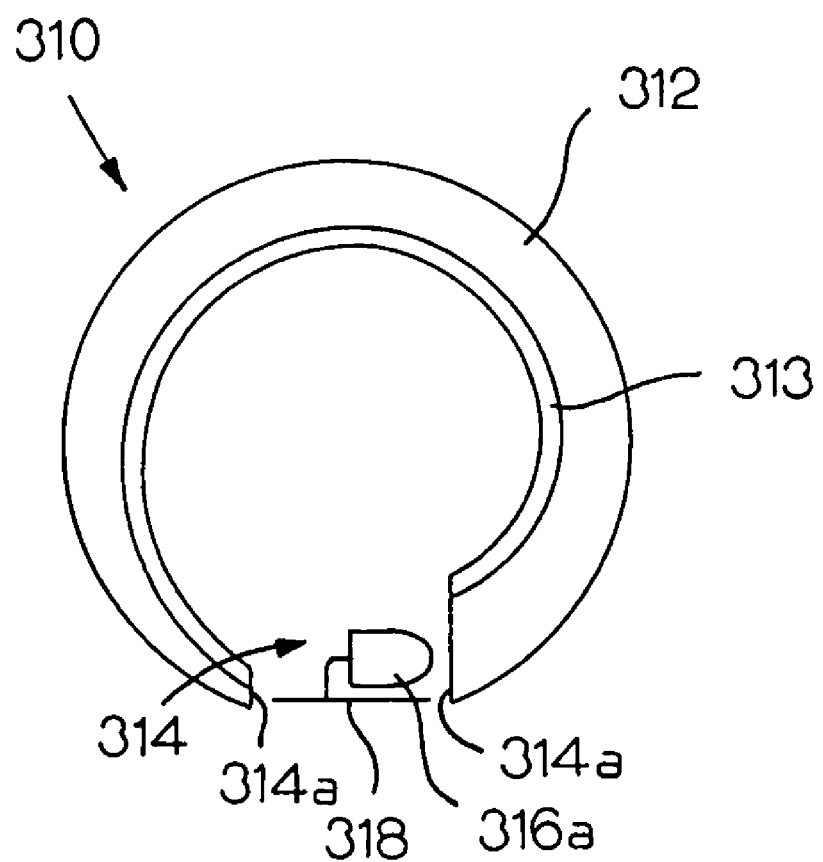
FIG. 5 is an end view of another alternate embodiment of an illumination device made in accordance with the present invention.

FIG. 5 is an end view of another alternate embodiment of an illumination device 310 made in accordance with the present invention. In this particular embodiment, the waveguide 312 has a substantially spiral cross-section, as further described below. A channel 314 is again defined through a portion the waveguide 312 along the length thereof. This channel 314 is adapted to receive an elongated light source and associated electrical accessories, which is preferably a multiplicity high-intensity, light-emitting diodes (LEDs) 316a. This channel 314 defines first and second opposite wall surfaces 314a, 314b in the waveguide 312. The LEDs 316a are operably connected to a circuit board 318, which is then positioned in and secured relative to the channel 314 of the waveguide 312.

Again, as illustrated in FIG. 5, the waveguide 312 has a substantially spiral cross-section in which the waveguide 312 has its greatest thickness at the wall surface 314b through which light is directed from the LEDs 316a, with the thickness of the wall of the waveguide 312 gradually decreasing until reaching a minimum at the wall surface 314a. The interior semi-reflective portion 313 of this particular illumination device 310 is also spaced at a distance from the light-emitting outer surface 312a of the waveguide and is preferably secured to the inner circumferential surface 312b of the waveguide 312. However, due to the spiral geometry of the waveguide 312, the distance between the light-emitting outer surface 312a of the waveguide 312 and the interior semi-reflective portion 313 decreases about the circumference of the waveguide 312.

Light emitted from the LEDs 316a is directed into the wall surface 314b of the waveguide 312. As the light enters and is directed about the circumference of the waveguide 312, a portion of the light is scattered and emitted through the light-emitting outer surface 312a of the waveguide 312. Light is also scattered and emitted through the inner circumferential surface 12b of the waveguide 312. However, the semi-reflective portion 313 reflects much of this light and causes it to also be scattered and emitted through the light-emitting outer surface 312a of the waveguide 312. The result of this guiding, reflecting, and emission of light is a substantially homogenous and uniform light intensity pattern over the light-emitting outer surface 312a of the waveguide 312 so as to simulate neon lighting. As the light traverses the waveguide 312, it is also "squeezed" by the decreasing thickness of the waveguide 312 to overcome the effects of attenuation and provide a uniform brightness about the circumference of the waveguide 312.

Aside from the specific geometries described above, it is further contemplated that the waveguide of the illumination device of the present invention could have a wide variety of cross-sectional geometries without departing from the spirit and scope of the present invention.

It will be obvious to those skilled in the art that other modifications may be made to the invention as described herein without departing from the spirit and scope of the present invention.

What is claimed is:

1. An illumination device for simulation of neon lighting, comprising:
    an elongated and substantially cylindrical waveguide having a light-emitting outer surface, a channel defined through a portion of said waveguide substantially along the length thereof, said channel defining opposing lateral wall surfaces, and said waveguide including an interior semi-reflective portion spaced at a predetermined distance from said light-emitting outer surface; and
    an elongated light source positioned within said channel, between said opposing lateral wall surfaces, and extending substantially along the length of said waveguide, said elongated light source being oriented so as to substantially direct light to one side and into one of said lateral wall surfaces, said light traversing said waveguide with a portion of said light being scattered and emitted through the light-emitting outer surface of said waveguide, said semi-reflective portion reflecting additional light and causing it also to be scattered and emitted through the light-emitting outer surface of said waveguide to create a substantially uniform light intensity pattern over the light-emitting outer surface of said waveguide.

2. The illumination device as recited in claim 1, wherein said waveguide has a substantially annular cross-section defining an inner circumferential surface, and said semi-reflective portion of the waveguide is secured to said inner circumferential surface.

3. The illumination device as recited in claim 2, wherein said semi-reflective portion is a coating applied to the inner circumferential surface of said waveguide.

4. The illumination device as recited in claim 3, wherein said coating is a spray paint applied to the inner circumferential surface of said waveguide.

5. The illumination device as recited in claim 1, wherein said elongated light source is a multiplicity of point light sources.

6. The illumination device as recited in claim 5, wherein said point light sources are light-emitting diodes.

7. The illumination device as recited in claim 6, wherein said light-emitting diodes are oriented in alternating directions along the length of said waveguide.

8. The illumination device as recited in claim 5, wherein said point light sources are encapsulated in a potting compound.

9. The illumination device as recited in claim 1, wherein said elongated light source and any associated electrical accessories are received in a tray, said tray being selectively positioned in and secured relative to the channel defined in said waveguide.

10. The illumination device as recited in claim 1, wherein said waveguide has a substantially annular cross-section and said semi-reflective portion is a central co-axial rod that extends the length of said waveguide.

11. The illumination device as recited in claim 1, wherein said waveguide has a substantially spiral cross-section with its greatest thickness at the wall surface through which light is directed from said elongated light source, the thickness of said waveguide gradually decreasing about the circumference of said waveguide, such that the distance between the light-emitting outer surface of said waveguide and the interior semi-reflective portion decreases about the circumference of said waveguide.

12. An illumination device for simulation of neon lighting, comprising:
    an elongated waveguide having a light-emitting outer surface, a channel defined through a portion of said waveguide substantially along the length thereof, said channel defining at least one wall surface, and said waveguide including an interior semi-reflective portion spaced at a predetermined distance from said light-emitting outer surface; and
    an elongated light source positioned within said channel and extending substantially along the length of said waveguide, said elongated light source being oriented so as to direct light into said at least one wall surface, said light traversing said waveguide with a portion of said light being scattered and emitted through the light-emitting outer surface of said waveguide, said semi-reflective portion reflecting additional light and causing it also to be scattered and emitted through the light-emitting outer surface of said waveguide to create a substantially uniform light intensity pattern over the light-emitting outer surface of said waveguide;
    wherein said elongated light source is a multiplicity of light-emitting diodes oriented in alternating directions along the length of said waveguide.

13. An illumination device for simulation of neon lighting, comprising:
    an elongated waveguide having a light-emitting outer surface, a channel defined through a portion of said waveguide substantially along the length thereof, said channel defining at least one wall surface, and said waveguide including an interior semi-reflective portion spaced at a predetermined distance from said light-emitting outer surface; and
    an elongated light source positioned within said channel and extending substantially along the length of said waveguide, said elongated light source being oriented so as to direct light into said at least one wall surface, said light traversing said waveguide with a portion of said light being scattered and emitted through the light-emitting outer surface of said waveguide, said semi-reflective portion reflecting additional light and causing it also to be scattered and emitted through the light-emitting outer surface of said waveguide to create a substantially uniform light intensity pattern over the light-emitting outer surface of said waveguide;
    wherein said waveguide has a substantially spiral cross-section with its greatest thickness at the wall surface through which light is directed from said elongated light source, the thickness of said waveguide gradually decreasing about the circumference of said waveguide, such that the distance between the light-emitting outer surface of said waveguide and the interior semi-reflective portion decreases about the circumference of said waveguide.

* * * * *